United States Patent
Garrone et al.

(10) Patent No.: US 9,557,843 B2
(45) Date of Patent: *Jan. 31, 2017

(54) VIBRATION SENSING SYSTEM AND METHOD FOR CATEGORIZING PORTABLE DEVICE CONTEXT AND MODIFYING DEVICE OPERATIONS

(71) Applicant: Apple Inc., Cupertino, CA (US)

(72) Inventors: Ryan J. Garrone, Cupertino, CA (US); Sean A. Mayo, Cupertino, CA (US); Scott A. Mullin, Gilbroy, CA (US); Gordon C. Cameron, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/543,391

(22) Filed: Nov. 17, 2014

(65) Prior Publication Data

US 2015/0070290 A1 Mar. 12, 2015

Related U.S. Application Data

(63) Continuation of application No. 13/196,834, filed on Aug. 2, 2011, now Pat. No. 8,892,162.

(60) Provisional application No. 61/478,893, filed on Apr. 25, 2011.

(51) Int. Cl.
| | |
|---|---|
| *G06F 3/041* | (2006.01) |
| *H04M 1/72* | (2006.01) |
| *H04M 1/725* | (2006.01) |
| *G06F 3/0354* | (2013.01) |

(52) U.S. Cl.
CPC ......... *G06F 3/0414* (2013.01); *G06F 3/03545* (2013.01); *H04M 1/72563* (2013.01)

(58) Field of Classification Search
CPC G06F 3/016; G06F 3/03547; G06F 2203/013; G06F 2203/0339; G06F 3/0416; G06F 3/0485; G06F 3/017; G06F 3/0338; G06F 3/0362; G06F 3/041; G06F 1/1643; G06F 1/169; G06F 2203/04105; Y10S 310/80
See application file for complete search history.

(56) References Cited

U.S. PATENT DOCUMENTS

| | | | |
|---|---|---|---|
| 5,734,373 A | | 3/1998 | Rosenberg et al. |
| 6,131,097 A | | 10/2000 | Peurach et al. |
| 8,892,162 B2 | | 11/2014 | Garrone et al. |
| 2006/0290662 A1 | * | 12/2006 | Houston et al. ............... 345/156 |
| 2008/0036591 A1 | | 2/2008 | Ray |
| 2008/0068348 A1 | | 3/2008 | Rosenberg et al. |
| 2009/0153350 A1 | * | 6/2009 | Steger et al. ............... 340/825.2 |
| 2009/0189878 A1 | | 7/2009 | Goertz et al. |

(Continued)

*Primary Examiner* — Nizar Sivji
(74) *Attorney, Agent, or Firm* — Brownstein Hyatt Farber Schreck, LLP

(57) ABSTRACT

Disclosed herein are methods for operating a computing device including determining an amount of pressure exerted on a touch-sensitive surface of the computing device. According to the various embodiments, a touch input is received by the touch-sensitive surface. The amount of pressure exerted by the touch input on the touch-sensitive surface is then determined. The computing device operates in a first manner when a first amount of pressure is received and operates in a second manner when a second amount of pressure is received.

20 Claims, 14 Drawing Sheets

(56) References Cited

U.S. PATENT DOCUMENTS

| | | |
|---|---|---|
| 2010/0175027 A1* | 7/2010 | Young et al. ................. 715/830 |
| 2010/0329441 A1 | 12/2010 | Smith |
| 2011/0138277 A1 | 6/2011 | Grant et al. |
| 2011/0260996 A1 | 10/2011 | Henricson |
| 2011/0291821 A1* | 12/2011 | Chung ....................... 340/407.2 |
| 2012/0254878 A1 | 10/2012 | Nachman et al. |

* cited by examiner

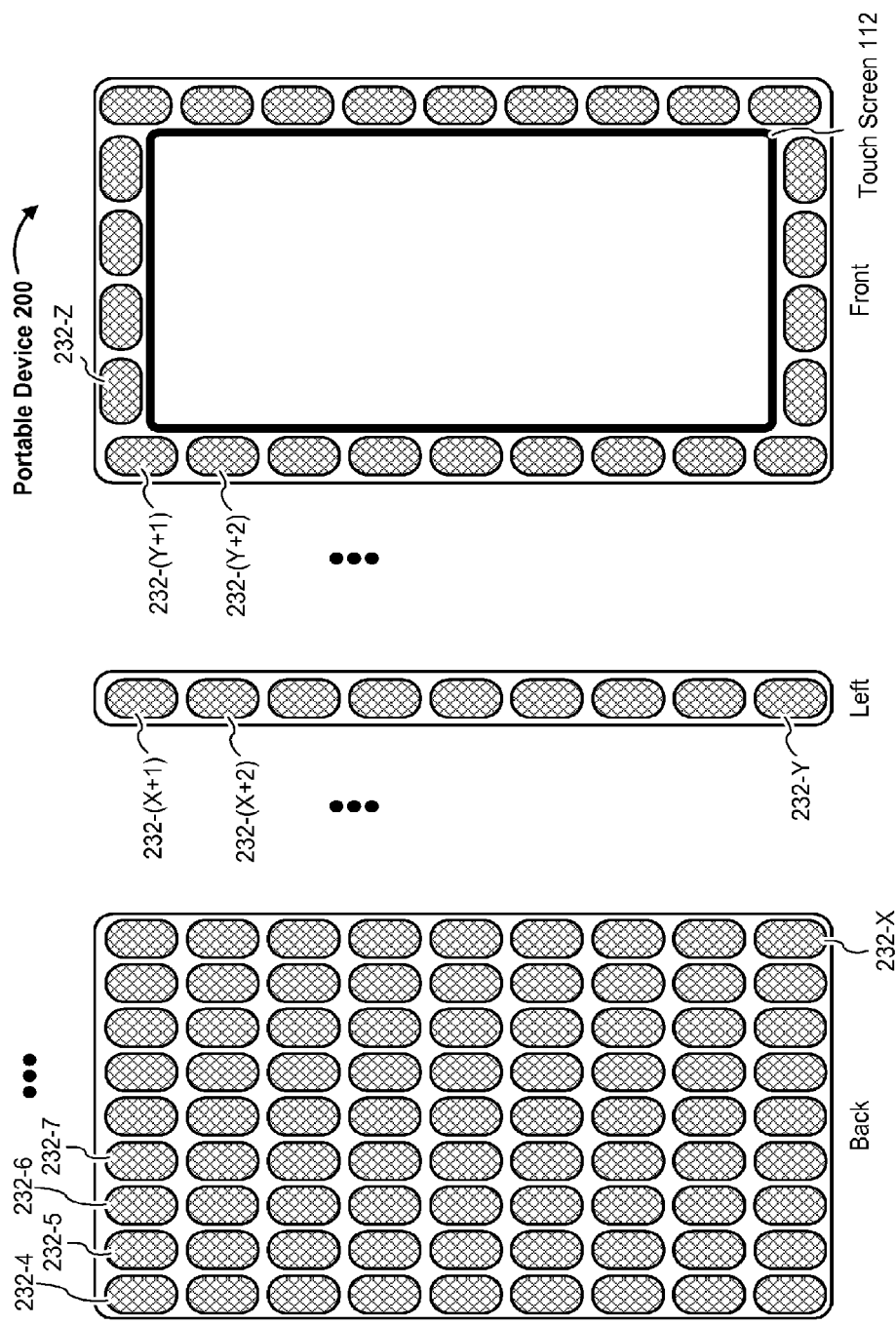

408 Modify operation of at least one application executed by the one or more processors in accordance with the determined holding state 422 Detect ambient brightness with a light sensor of the portable device. The method includes modifying operation of at least one application executed by the one or more processors in accordance with the determined holding state and the ambient brightness.

424 Modify a length of a ringtone at least in accordance with the determined holding state and the ambient brightness. The ringtone is played at the portable device in response to an incoming call.

426 Conditionally modify an application in the one or more programs in accordance with the determined holding state and the ambient brightness such that the application conditionally does not light up the display. The application is configured to light up a display of the portable device by default in response to an input on one or more manual user input devices of the portable device.

428 Launch a pedometer application in accordance with the determined holding state and the ambient brightness 430 Detect an acceleration of the portable device using at least one accelerometer of the portable device. Modify operation of at least one application executed by the one or more processors in accordance with the determined holding state and the acceleration of the portable device.

432 Modify a length of a ringtone at least in accordance with the determined holding state and the acceleration of the portable device. The ringtone is played at the portable device in response to an incoming call.

Figure 4B

408 Modify operation of at least one application executed by the one or more processors in accordance with the determined holding state 434 Determine one or more locations of one or more contacts by a user on the enclosure of the portable device in accordance with the one or more signals produced by the one or more sensors 436 Identify a user in accordance with the one or more locations of the one or more contacts 438 Receive one or more user contact areas on a touch-sensitive surface of the portable device. Determine, for each user contact area, a respective finger contact coordinate tuple based on a respective location of a respective finger contact area and the determined holding state. Manipulate at least one of one or more user interface objects displayed on a display of the portable device in accordance with the one or more respective finger contact coordinate tuples.

Figure 4C

VIBRATION SENSING SYSTEM AND METHOD FOR CATEGORIZING PORTABLE DEVICE CONTEXT AND MODIFYING DEVICE OPERATIONS

CROSS-REFERENCE TO RELATED APPLICATION

This application is a continuation of U.S. patent application Ser. No. 13/196,834, filed Aug. 2, 2011, now U.S. Pat. No. 8,892,162, which claims the benefit under 35 U.S.C. §119(e) of U.S. Provisional Patent Application No. 61/478,893, filed on Apr. 25, 2011, both of which are incorporated by reference as if fully disclosed herein.

TECHNICAL FIELD

This relates generally to electronic devices with touch-sensitive surfaces, including but not limited to electronic devices that detect touches based on vibration sensing.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

SUMMARY

New devices and methods for categorizing context of a device (e.g., environment of the device or status of the user) are described. Such methods and interfaces may complement or replace device operations, including conventional methods for manipulating user interface objects. Such methods and interfaces reduce the cognitive burden on a user and produce a more efficient human-machine interface.

In some embodiments, the device is portable (e.g., a notebook computer, tablet computer, or handheld device). In some embodiments, the device has a touch-sensitive display (also known as a "touch screen" or "touch screen display"). In some embodiments, the device has a touchpad. In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, a portable device includes: an enclosure; one or more processors for executing one or more programs; one or more actuators in or on the enclosure for generating mechanical vibrations; one or more sensors in or on the enclosure for detecting mechanical vibrations; and memory storing one or more programs for execution by the one or more processors. The one or more programs include: instructions for analyzing one or more signals produced by the one or more sensors with respect to mechanical vibrations to determine a holding state of the portable device; and instructions for modifying operation of at least one application executed by the one or more processors in accordance with the determined holding state.

In accordance with some embodiments, a portable telephone device includes: an enclosure; one or more processors for executing one or more programs; one or more actuators in or on the enclosure for generating mechanical vibrations; one or more sensors in or on the enclosure for detecting mechanical vibrations; and memory storing one or more programs for execution by the one or more processors. The one or more programs include: instructions for analyzing one or more signals produced by the one or more sensors with respect to mechanical vibrations to determine a holding state of the portable telephone device; and instructions for conditionally answering an incoming call in accordance with a change in the determined holding state of the portable telephone device.

In accordance with some embodiments, a method is performed at a portable device that includes an enclosure, one or more processors for executing one or more programs, one or more actuators in or on the enclosure, one or more sensors in or on the enclosure, and memory storing one or more programs for execution by the one or more processors. The method includes: generating mechanical vibrations with the one or more actuators; detecting mechanical vibrations with the one or more sensors; analyzing one or more signals produced by the one or more sensors with respect to mechanical vibrations to determine a holding state of the portable device; and modifying operation of at least one application executed by the one or more processors in accordance with the determined holding state.

In accordance with some embodiments, a method is performed at a portable telephone device that includes an enclosure, one or more processors for executing one or more programs, one or more actuators in or on the enclosure, one or more sensors in or on the enclosure, and memory storing one or more programs for execution by the one or more processors. The method includes: generating mechanical vibrations with the one or more actuators; detecting mechanical vibrations with the one or more sensors; analyzing one or more signals produced by the one or more sensors with respect to mechanical vibrations to determine a holding state of the portable telephone device; and conditionally answering an incoming call in accordance with a change in the determined holding state of the portable telephone device.

In accordance with some embodiments, a non-transitory computer-readable storage medium stores one or more programs for execution by one or more processors of a portable device that includes an enclosure, one or more actuators in or on the enclosure, and one or more sensors in or on the enclosure. The one or more programs include instructions for performing any of the above methods.

In accordance with some embodiments, a portable device includes: an enclosure; one or more processors for executing one or more programs; one or more actuators in or on the enclosure for generating mechanical vibrations; one or more sensors in or on the enclosure for detecting mechanical vibrations; and memory storing one or more programs for execution by the one or more processors. The one or more programs include instructions for performing any of the above methods.

In accordance with some embodiments, a portable device includes: an enclosure; means for generating mechanical vibrations; means for detecting mechanical vibrations; and means for performing any of the above methods.

In accordance with some embodiments, an information processing apparatus for use in a portable device with an enclosure, one or more actuators in or on the enclosure, and one or more sensors in or on the enclosure, includes means for performing any of the above methods.

In accordance with some embodiments, a portable device includes an actuator unit for generating mechanical vibrations; a sensor unit for detecting mechanical vibrations; and a processing unit coupled to the actuator unit and the sensor unit. The processing unit is configured to: analyze one or more signals produced by the sensor unit with respect to mechanical vibrations to determine a holding state of the portable device; and modify operation of at least one application executed by the processing unit in accordance with the determined holding state.

In accordance with some embodiments, a portable telephone device includes: an actuator unit for generating mechanical vibrations; a sensor unit for detecting mechanical vibrations; and a processing unit coupled to the actuator unit and the sensor unit. The processing unit is configured to: analyze one or more signals produced by the sensor unit with respect to mechanical vibrations to determine a holding state of the portable device; and conditionally answer an incoming call in accordance with a change in the determined holding state of the portable telephone device.

Thus, portable devices with actuators and vibration sensors enable faster, more efficient human-machine interfaces, thereby increasing the effectiveness, efficiency, and user satisfaction with such devices. Such methods and interfaces may complement or replace conventional human-machine interfaces.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 2A-2E illustrate a portable device in accordance with some embodiments.

FIGS. 4A-4C are flow diagrams illustrating a method of conditionally modifying operation of a portable device in accordance with a holding state in accordance with some embodiments.

DETAILED DESCRIPTION

Determining the context of a device (e.g., whether the device is held tightly or loosely, whether the device is held by a user or stored in a pocket, whether the device is carried by a user walking on stairs, whether the device is carried by a running user, etc.) can improve human-machine interface. In some embodiments, such determination is accomplished using components commonly found in portable electronic devices. For example, actuators and sensors within a mobile phone may be used to determine the context of the mobile phone. Therefore, the methods and devices described herein may be easily implemented into existing portable devices.

Figure 3:
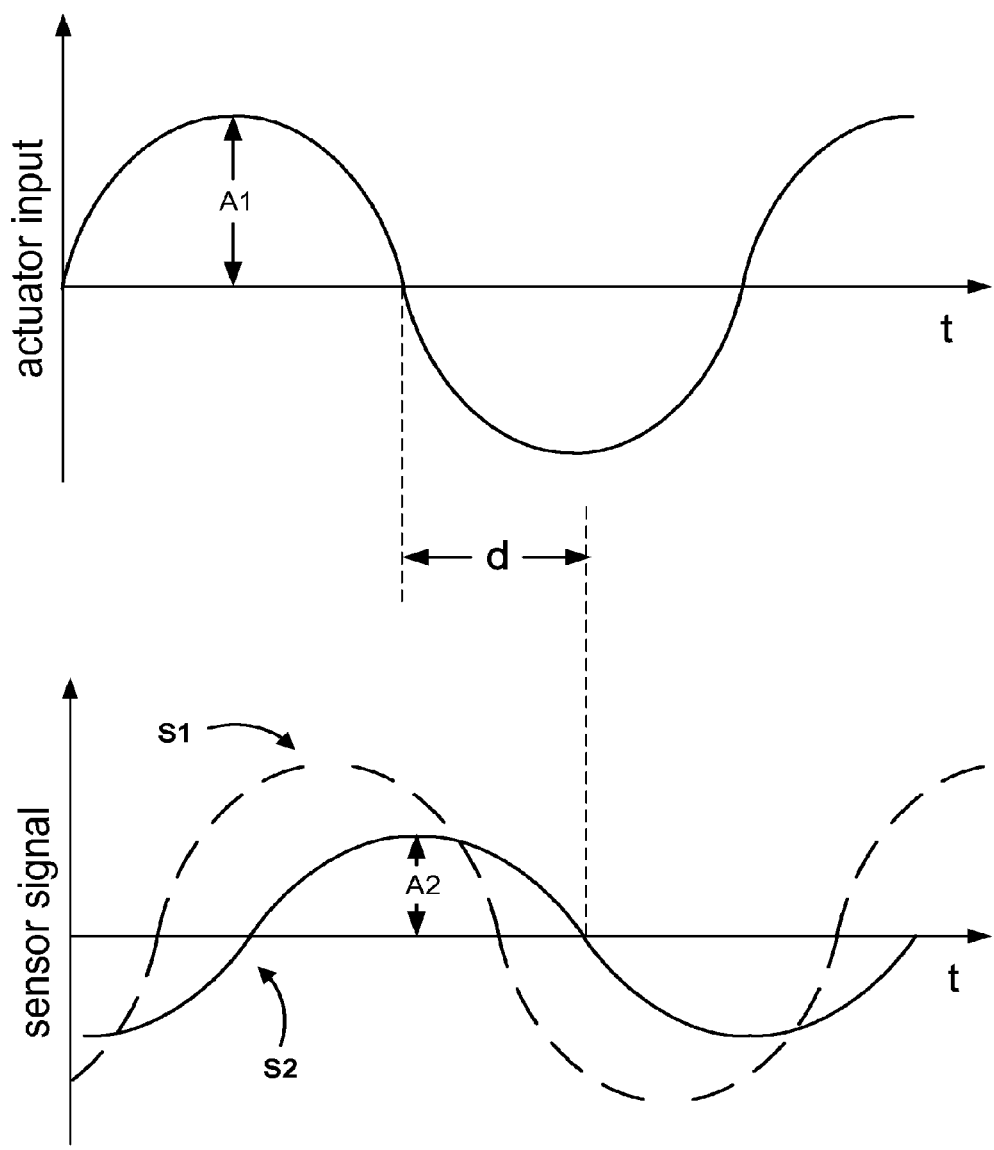
FIG. 3 illustrates exemplary actuator input and exemplary sensor signal in accordance with some embodiments.
Figure 4A:
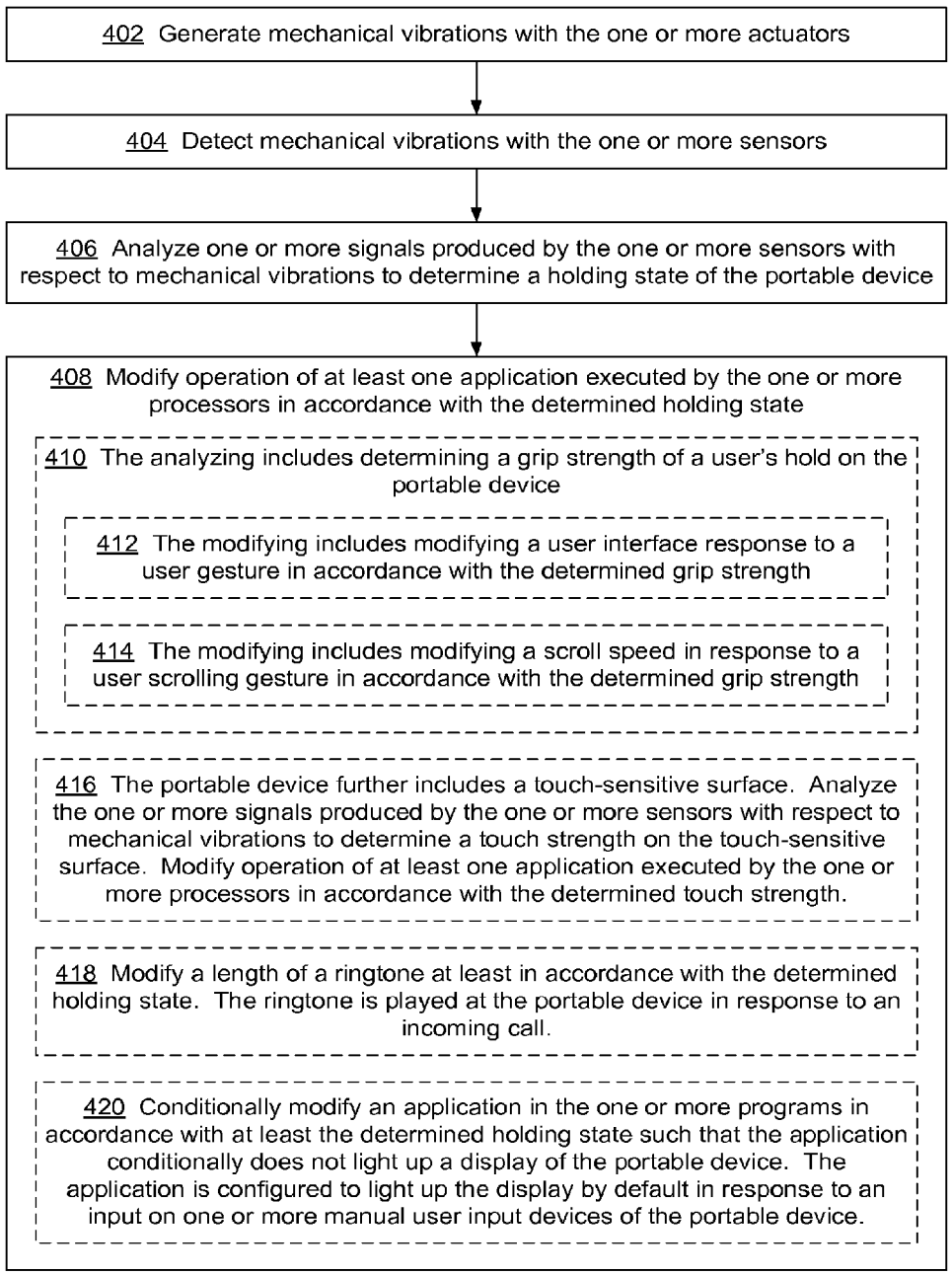
Figure 5:
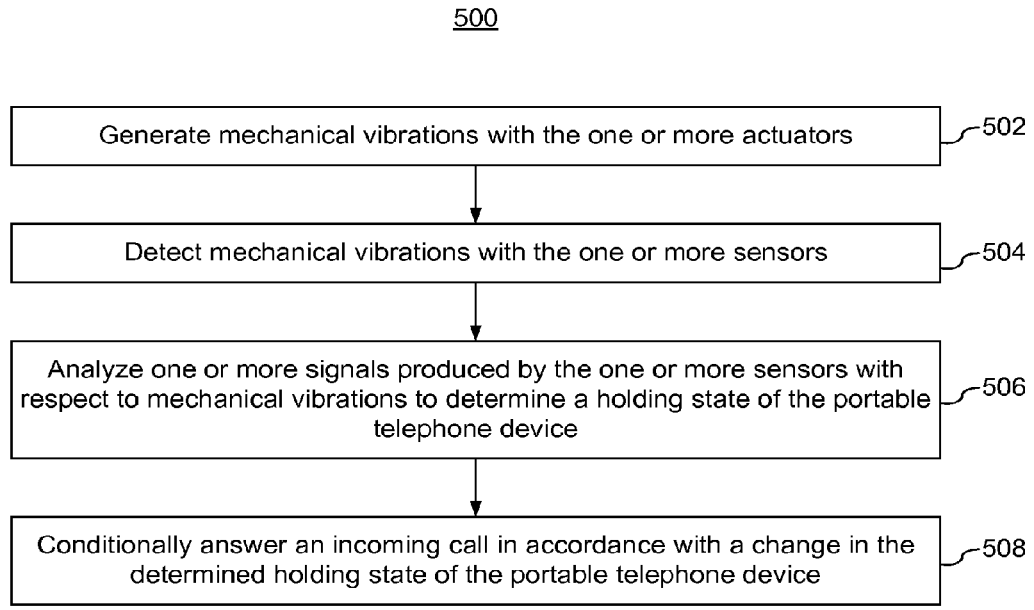
FIG. 5 is a flow diagram illustrating a method of conditionally answering an incoming call in accordance with a change in a holding state in accordance with some embodiments.

Below, FIGS. 1A-1B and 2A-2E provide a description of exemplary devices. FIG. 3 illustrates exemplary signals provided to actuator(s) and detected by sensor(s) of exemplary devices. FIGS. 4A-4C are flow diagrams illustrating a method of conditionally modifying operation of an exemplary device. FIG. 5 is a flow diagram illustrating a method of conditionally answering an incoming call at an exemplary device.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 1A:
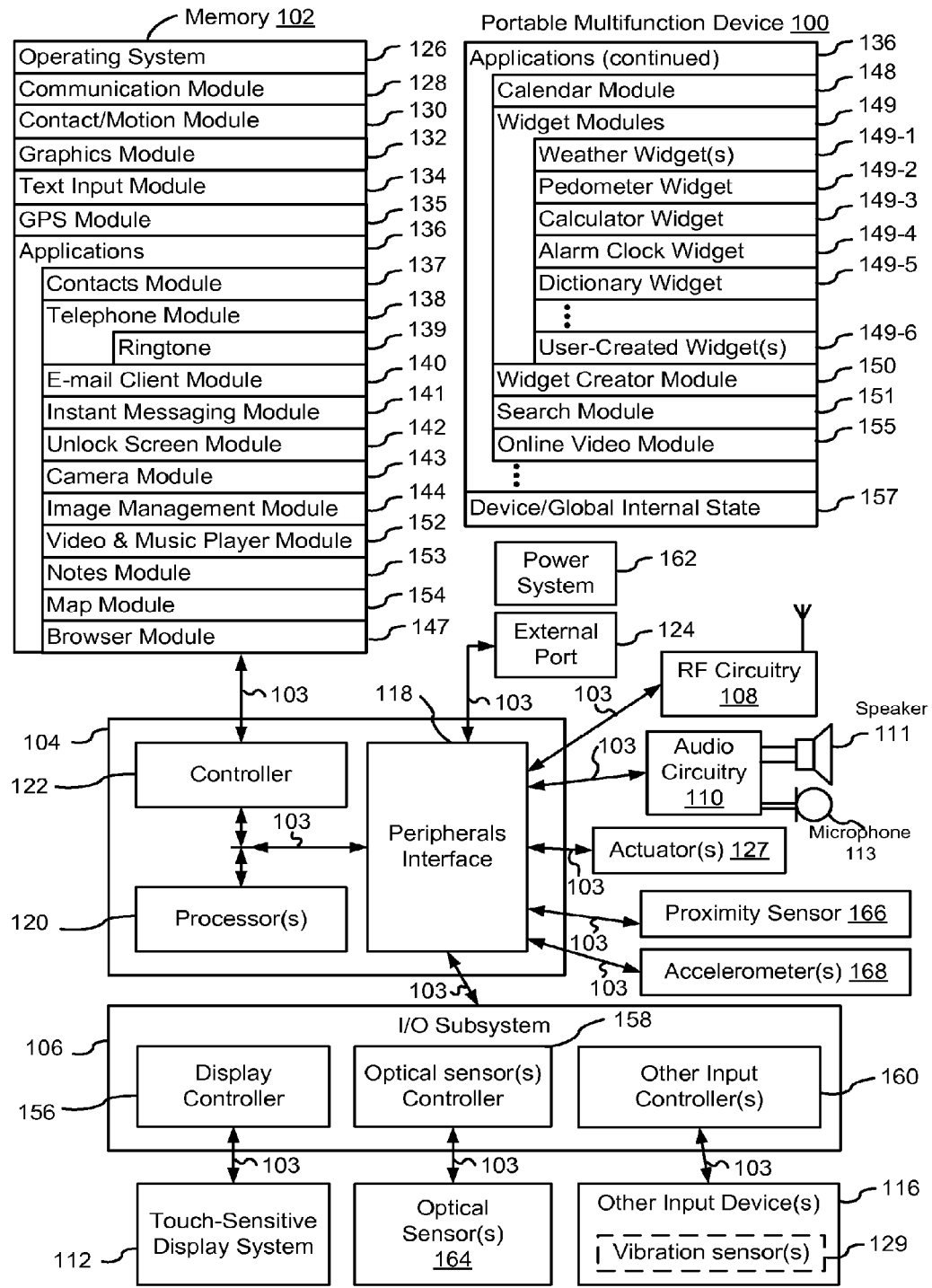
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack. The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input devices 116 include vibration sensor(s) 129. In some embodiments, vibration sensor(s) 129 include accelerometer(s) 168. In some embodiments, vibration sensor(s) 129 include one or more of: piezoelectric vibration sensors (e.g., piezoelectric displacement sensors, and/or piezoelectric velocity sensors), and micro-electro-mechanical system (MEMS) vibration sensors. In some embodiments, vibration sensor(s) 129 include one or more gyroscopes and/or one or more compasses. In some embodiments, vibration sensor(s) 129 include one or more microphones. In some embodiments, vibration sensor(s) 129 include at least one optical system (e.g., a laser aligned with a photodiode). Such optical system, which is highly sensitive to vibrations, can be used to give an accurate measure of vibrations. The other input devices 116 may also include one or more of: physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons may include an up/down button for volume control of speaker 111 and/or microphone 113. The one or more buttons may include a push button.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. Optical sensor 164 is also configured to detect ambient brightness. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 includes one or more actuator(s) 127 for generating mechanical vibrations. In some embodiments, the one or more actuator(s) 127 include one or more motors (e.g., cell phone or pager motors that generate mechanical vibration to indicate incoming calls). In some embodiments, the one or more actuator(s) 127 include speaker 111. In some embodiments, the one or more actuator(s) 127 include one or more piezoelectric actuators (e.g., a piezo speaker). In some embodiments, the one or more piezoelectric actuators include at least one piezoelectric actuator attached (e.g., on one side of the piezoelectric actuator) to an enclosure of device 100 and also connected (e.g., on an opposite side of the piezoelectric actuator) to a mass (e.g., a weight or a component of device 100, such as a cover glass or battery).

In some embodiments, actuator 127 includes one or more layers of electroactive polymers (e.g., electroactive polymers attached to a mass).

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. The one or more accelerometers 168 may include one or more single-axis accelerometers and/or one or more multi-axis (e.g., triaxial) accelerometers. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, 1M 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:

contacts module 137 (sometimes called an address book or contact list);
    telephone module 138, which typically includes one or more ringtones 139;
    e-mail client module 140;
    instant messaging (1M) module 141;

unlock screen module 142, which typically provides a screen saver function;

camera module 143 for still and/or video images;

image management module 144;

browser module 147;

calendar module 148;

widget modules 149, which may include one or more of: weather widget 149-1, pedometer widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which may be made up of a video player module and a music player module;

notes module 153;

map module 154; and/or online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conferencing, e-mail 140, or 1M 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in an address book (e.g., using contacts module 137), modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, a videoconferencing module (not shown) includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 152, a workout support module includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, pedometer widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
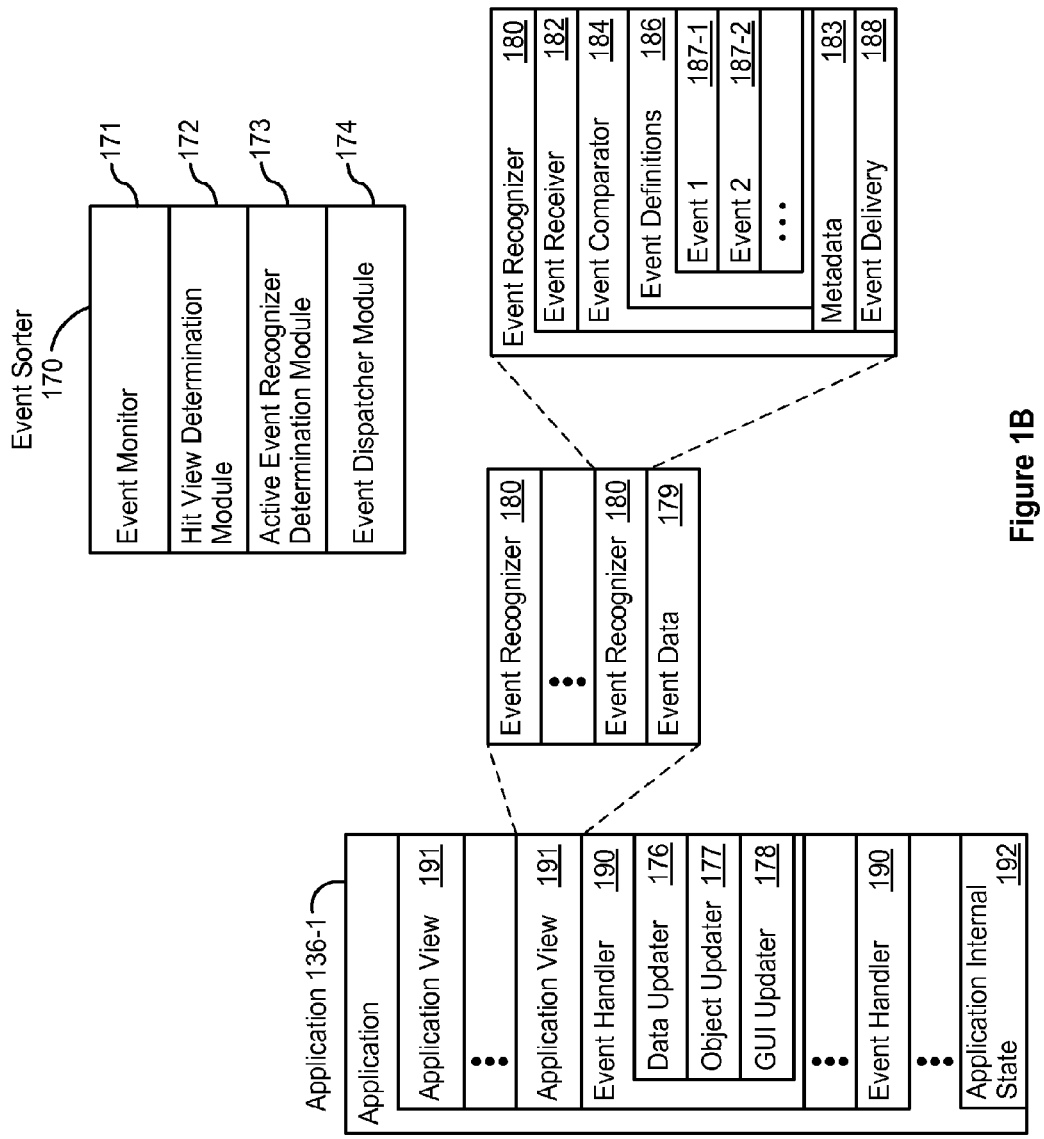
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) includes event sorter 170 (e.g., in operating system 126) and a respective application 136-1 (e.g., any of the aforementioned applications 137-151 and 155).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 176 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

FIG. 2A-2E illustrate portable device 200 in accordance with some embodiments. Portable device 200 includes a subset of subsystems, components, and modules illustrated in FIGS. 1A-1B. For example, portable device 200 optionally includes all the subsystems, components, and modules illustrated in FIGS. 1A-1B (i.e., portable device 200 may include portable multifunction device 100). Alternatively, portable device 200 is a telephone device having less than all the modules or components illustrated in FIGS. 1A-1B. In some embodiments, portable device 200 includes touch screen 112.

Figure 2A:
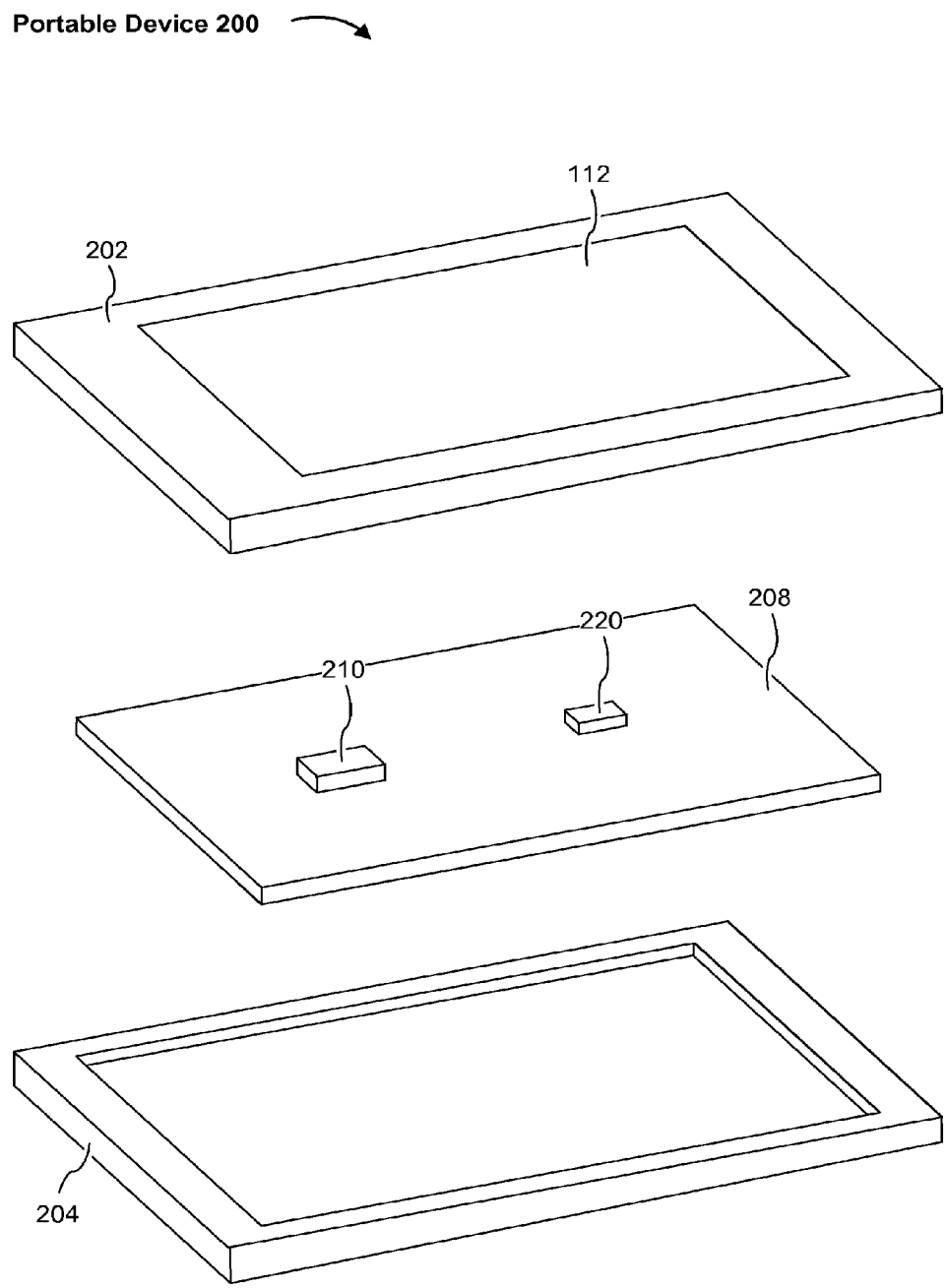

FIG. 2A is a high-level exploded view of portable device 200 in accordance with some embodiments. In FIG. 2A, portable device 200 includes an enclosure (e.g., front cover 202 and back cover 204). Touch screen 112 is coupled with front cover 202. Between front cover 202 and back cover 204 is circuit board 208. Circuit board 208 typically includes at least a subset of components illustrated in FIG. 1A (e.g., processor(s) 120 and controller 122), some of which are omitted in FIG. 2A for brevity. Circuit board 208 includes actuator 210 for generating mechanical vibrations and sensor 220 for detecting mechanical vibrations. In some embodiments, actuator 210 includes actuator 127 (FIG. 1A, such as a motor) and/or speaker 111 (FIG. 1A). In some embodiments, sensor 220 includes accelerometer 168 (FIG. 1A), and/or vibration sensor 129 (FIG. 1A).

Although depicted as two separate elements, actuator 210 and sensor 220 may be packaged together as a single component (or a same device). Therefore, in some embodiments, portable device 200 includes a transducer that is configured to generate mechanical vibrations and also detect mechanical vibrations (e.g., by generating electrical signals in response to mechanical vibrations). In some embodiments, the transducer includes a piezo transducer (e.g., a piezoelectric transducer) or audio speaker 111 (FIG. 1A).

Although depicted as two separate elements (e.g., front cover 202 and back cover 204), the enclosure may be integrally formed as a single element. Alternatively, the enclosure may comprise three or more elements.

Figure 2B:
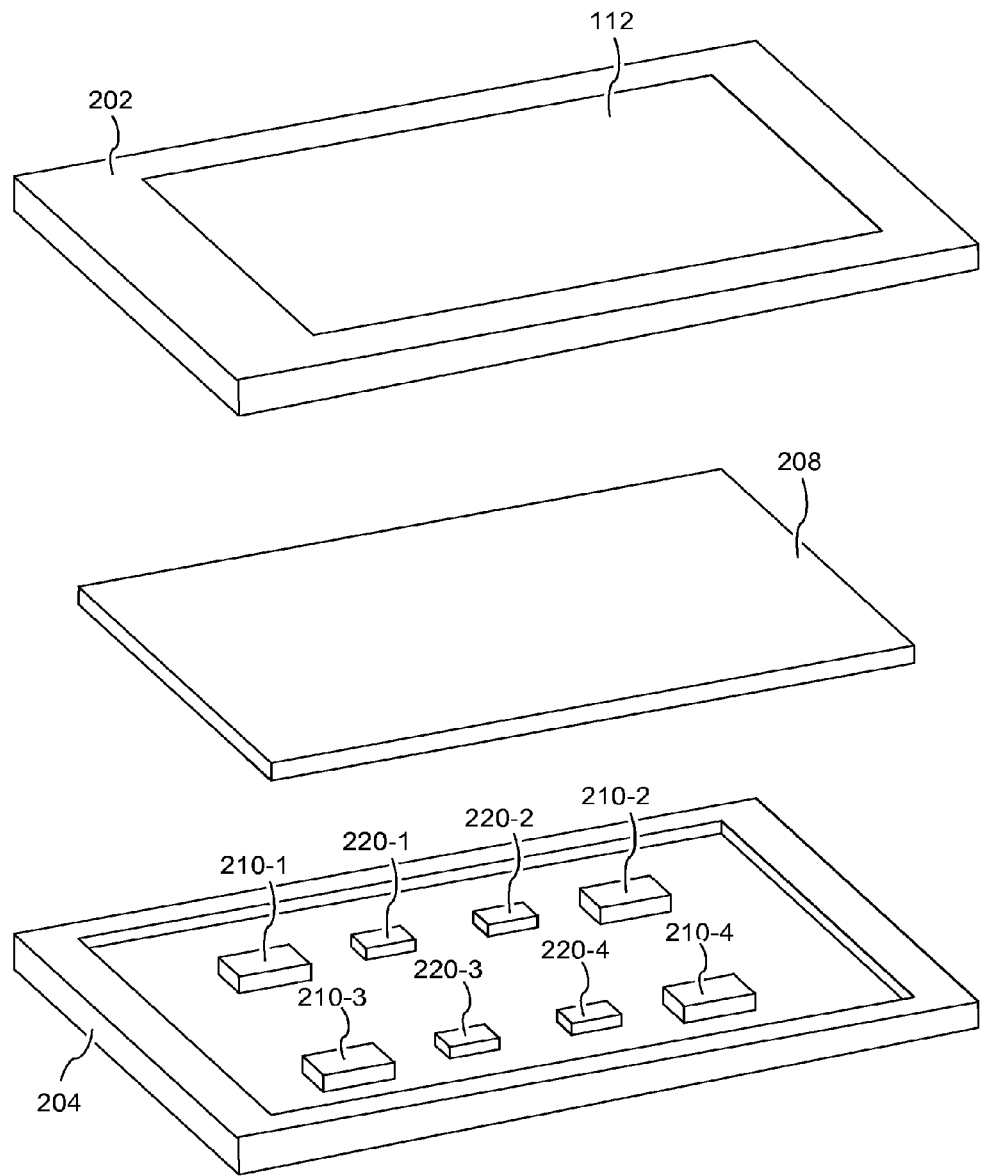

Although FIG. 2A depicts an embodiment of portable device 200 with a single actuator and a single sensor, portable device 200 may include a plurality of actuators and sensors. FIG. 2B is another high-level exploded view of portable device 200 in accordance with some embodiments. In FIG. 2B, a plurality of actuators (e.g., actuators 210-1 through 210-4) and a plurality of sensors (e.g., sensors 220-1 through 220-4) are located on the inner surface of back cover 204 (e.g., the surface facing circuit board 208). Alternatively, actuators 210 and sensors 220 are located on the outer surface of back cover 204 (e.g., the surface facing away from circuit board 208) or embedded in back cover 204.

Figure 2C:
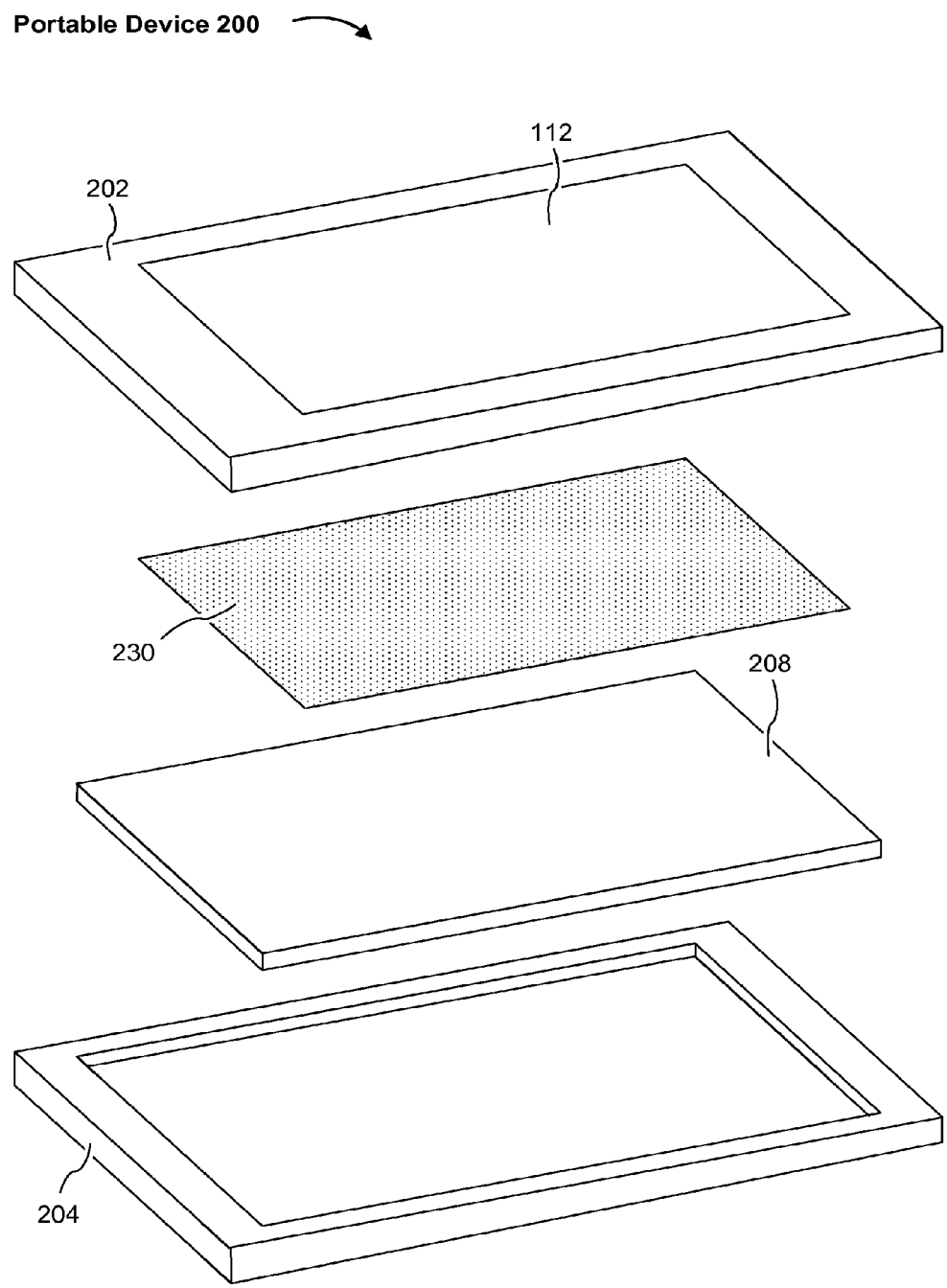

FIG. 2C is yet another high-level exploded view of portable device 200 in accordance with some embodiments. In FIG. 2C, actuators and sensors are included in subsystem 230 which is placed underneath, or embedded in, touch screen 112. For example, subsystem 230 includes a layer of piezoelectric material deposited underneath touch screen 112 for generating mechanical vibrations and detecting mechanical vibrations. In some embodiments, the layer of piezoelectric material in subsystem 230 is patterned to form a plurality of piezoelectric components. In some embodiments, the plurality of piezoelectric components includes one or more piezoelectric components for generating mechanical vibrations and one or more separate piezoelectric components for detecting mechanical vibrations.

Figure 2D:
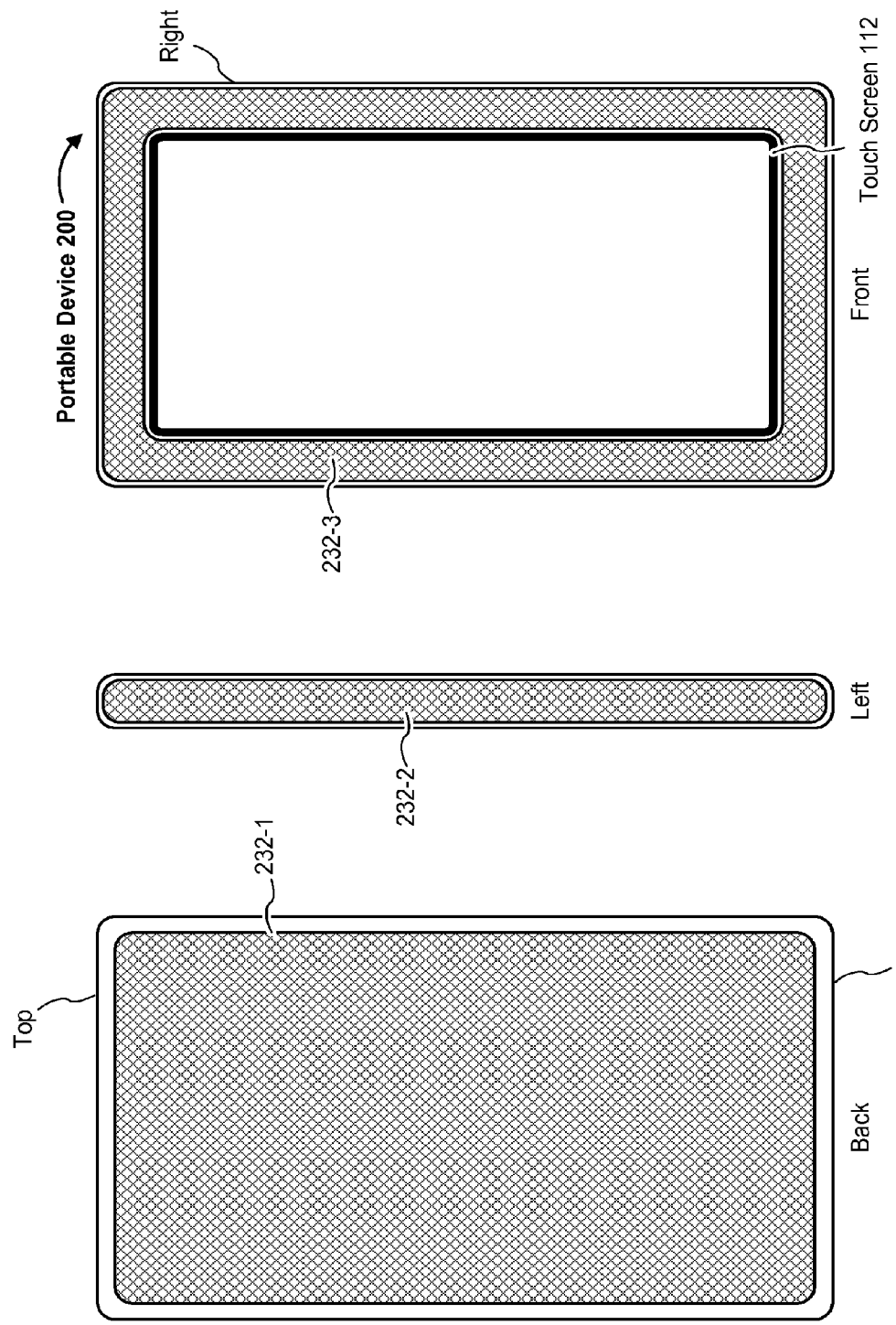

FIGS. 2D and 2E illustrate portable devices 200 having subsystems 232, in accordance with some embodiments. In some embodiments, each subsystem 232 corresponds to subsystem 230 depicted in FIG. 2C. In other words, each subsystem 232 includes one or more actuators and one or more sensors. In FIG. 2D, portable device 200 includes one or more of: subsystem 232-1 on or in the back enclosure, subsystem 232-2 on or in the side of the enclosure, and subsystem 232-3 on or in the front enclosure. Portable device 200 may include a subsystem on or in the top and/or bottom side of the enclosure.

In FIG. 2E, portable device 200 includes a plurality of subsystems 232. In some embodiments, the plurality of subsystems 232 is not uniformly distributed. In some embodiments, the plurality of subsystems 232 is more densely positioned along the edges than near the center, or vice versa (not shown). In some embodiments, a plurality of subsystems 232 is positioned along the edges of portable device 200, and are not located near the center of a respective surface, such as the front surface, of device 200 (not shown).

As shown in FIGS. 2A-2E, portable device 200 includes one or more actuators and one or more sensors. The number of actuators in portable device 200 need not match the number of sensors in portable device 200 (i.e., the number of actuators is different from the number of sensors). Furthermore, the actuators need not be located on the same surface as the sensors (e.g., at least one actuator is located on circuit board 208, and at least one sensor is located on back cover 204). In fact, actuators and sensors may be located anywhere in or on the enclosure of the device (e.g., actuators and sensors may be located on or in each of front cover 202, circuit board 208, and back cover 204).

FIG. 3 illustrates exemplary actuator input provided to an actuator (e.g., actuator 210, FIG. 2A) and an exemplary sensor signal detected by a sensor (e.g., sensor 220, FIG. 2A) in accordance with some embodiments. The actuator input and the sensor signal are plotted as functions of time (e.g., each horizontal axis represents time, and each vertical axis represents an intensity or amplitude of a respective input or signal). It should be appreciated that the actuator input and the sensor signal illustrated in FIG. 3 are prophetic examples, and are not drawn to scale.

In FIG. 3, the illustrated actuator input and the sensor signal have sinusoidal waveforms. The actuator input has amplitude A1, and the sensor signal has amplitude A2. As illustrated, the actuator input and the sensor signal has a phase difference, d. The amplitude A2 and the phase difference d of the sensor correspond to changes in response to one or more touches on the enclosure of portable device 200 (e.g., from S1 to S2). For example, when a user grabs portable device 200 with a firm grip, the amplitude of the sensor signal is lower compared to when the user grabs portable device 200 with a light grip. Typically, the phase difference d also changes in response to the grip strength. Therefore, the amplitude A2 and/or the phase difference d can be used to determine the grip strength.

In addition, in some embodiment the amplitude A2 and phase difference d are obtained from multiple sensors, thereby providing multiple signals from which determine grip strength, position, etc. Further, the amplitude A2 and the phase difference d at any one sensor may vary depending on a number of contacts on the enclosure (e.g., one finger v. two fingers), the overall area contacted by the contacts (e.g., one finger v. entire palm), and a distance from a respective sensor to a location of a respective contact. Therefore, the amplitude A2 and/or the phase difference d from one or more sensors can be used to determine one or more locations of one or more contacts and/or a holding state (e.g., held by a thumb and an index finger v. held by five fingers and a palm). Similarly, the amplitude A2 and/or the phase difference d from one or more sensors can be used to determine whether the device is held with a left-hand or a right-hand (e.g., one or more sensors located near a palm of a holding hand will detect a larger contact area than one or more sensors located near fingers). Furthermore, the amplitude A2 and the phase difference d may also vary depending on mechanical properties of the contacts (e.g., contacts made with a finger v. contacts made by clothing). Therefore, the amplitude A2 and/or the phase difference d from one or more sensors can be used to determine an environment of portable device (e.g., in a pocket or a bag v. hand-held).

Although the actuator input and the sensor signal are depicted as having sinusoidal waveforms, other waveforms may be used. For example, the actuator input may include a square wave, a triangle wave, a sawtooth wave, or a superposition of multiple waveforms. In some embodiments, other properties of the sensor signal (e.g., rise time and/or fall time) may be used in addition to, or instead of, at least one of the amplitude A2 and the phase difference d in determining the holding state of the device. Furthermore, the actuator input and the sensor signal need not be continuous. Especially when a single transducer is used for both generating and detecting mechanical vibrations, a discrete signal (e.g., a step function or a top-hat function) may be provided as an input to the transducer, and a subsequent response (e.g., rise time or fall time) may be monitored. When portable device 200 includes a plurality of actuators (e.g., 210-1 through 210-4 in FIG. 2B, and/or subsystems 232 in FIG. 2E), the plurality of actuators need not generate mechanical vibrations simultaneously or harmonically. In some embodiments, the plurality of actuators is configured to generate mechanical vibrations in accordance with a predefined pattern. The predefined pattern defines at least the timing and duration for generation of mechanical vibrations by respective actuators.

At least in some embodiments, each actuator generates mechanical vibrations of a respective frequency and amplitude such that the mechanical vibrations are not perceived by a user of portable device 200. For example, the frequency may be set below or above a hearing range (e.g., 20 Hz to 20 kHz). Alternatively, the frequency is within the hearing range, but the amplitude is set sufficiently low that the user cannot hear the mechanical vibrations or is unlikely to hear the mechanical vibrations. Similarly, the amplitude and frequency may be set so that the user may not feel the mechanical vibrations by touch.

Associated Processes

Attention is now directed towards embodiments of associated processes that may be implemented on a portable device with one or more actuators and one or more sensors, such as portable multifunction device 100 or portable device 200.

FIGS. 4A-4C are flow diagrams illustrating method 400 of conditionally modifying an operation of a device in accordance with some embodiments. Method 400 is performed at a portable electronic device (e.g., portable multifunction device 100, FIG. 1) having an enclosure, one or more actuators and one or more sensors. In some embodiments, the one or more actuators are located in or on the enclosure, and the one or more sensors are located in or on the enclosure. The portable device includes one or more processors for executing one or more programs, and memory storing one or more programs for execution by the one or more processors. In some embodiments, the portable electronic device includes a display and/or a touch-sensitive surface. In some embodiments, the display is a touch screen display and the touch-sensitive surface is on the display. In some embodiments, the display is separate from the touch-sensitive surface. In various implementations, some operations of method 400 may be combined and/or the order of some operations may be changed.

The device generates (402) mechanical vibrations with the one or more actuators (e.g., actuators 127 and/or speaker 111 in FIG. 1A, actuators 210 in FIGS. 2A-2B, or subsystems 230 and/or 232 in FIGS. 2C-2E).

The device detects (404) mechanical vibrations with the one or more sensors (e.g., sensors 129 and/or accelerometers 168 in FIG. 1A, sensors 220 in FIGS. 2A-2B, or subsystems 230 and/or 232 in FIGS. 2C-2E).

The device analyzes (406) one or more signals produced by the one or more sensors with respect to mechanical vibrations to determine a holding state of the portable device (e.g., based on the amplitude, phase, or any other properties of mechanical vibrations). For example, the device may determine that the device is held by a hand, left on a hard surface (e.g., a tabletop), or surrounded by clothing (e.g., in a pocket or in a bag); and if held by a hand, the number of fingers holding the device and/or whether a palm is contacting the device.

The device modifies (408) operation of at least one application (e.g., any of modules or widgets depicted in FIG. 1A) executed by the one or more processors in accordance with the determined holding state. In some implementations, operation 408 comprises conditionally modifying operation of at least one application in accordance with the determined holding state. In some circumstances, the device does not modify the operation in accordance with the determined holding state, and as a result a default operation is performed.

In some embodiments, the analyzing includes (410) determining a grip strength of a user's hold on the portable device. In some embodiments, the grip strength is a value determined on a continuous or semi-continuous scale (e.g., 0 to 1). In some embodiments, determining the grip strength includes classifying the grip strength into one of predefined categories (e.g., not held, regular grip, and tight grip).

In some embodiments, the modifying includes (412) modifying a user interface response to a user gesture in accordance with the determined grip strength. In some embodiments, the device modifies a response to a swipe gesture in response to a tight grip so that a displayed user interface element scrolls less in response to the swipe gesture. In some embodiments, the device modifies a displayed user interface in response to a tight grip such that a portion of the displayed user interface is zoomed in so as to assist a user to provide an accurate touch input. In some embodiments, the device modifies an auto-correction or auto-suggestion function so that the auto-correction or auto-suggestion function provides a result distinct from a result that would be provided with a regular grip. In some embodiments, in response to a determination that no grip is detected on the device, the device increases a volume and length of a ringtone that is played in response to an incoming call or message (e.g., so that a user can better hear the ringtone). In some embodiments, in response to the determination that no grip is detected on the device, the device increases a volume but decreases a length of a ringtone (e.g., so as not to interrupt the user for long and also to reduce battery usage (i.e., reduce the amount of power drawn from the battery)). In some embodiments, in response to the determination that no grip is detected on the device, the device changes a ringtone to a different sound or music, or increases the amplitude of signaling vibrations that are generated in response to an incoming call or message.

In some embodiments, the modifying includes (414) modifying a scroll speed in response to a user scrolling gesture in accordance with the determined grip strength. For example, in accordance with a determination that the device is held with a regular grip, the device responds to a swipe gesture by scrolling a graphical user interface at a first speed. In accordance with a determination that the device is held with a tight grip, the device responds to a swipe gesture by scrolling a graphical user interface at a second speed lower than the first speed. This allows a user to more accurately scroll when the device is held with a tight grip.

In some embodiments, the portable device further includes (416) a touch-sensitive surface. The device analyzes the one or more signals produced by the one or more sensors with respect to mechanical vibrations to determine a touch strength on the touch-sensitive surface (e.g., how hard a contact is pressed onto the touch-sensitive surface), and modifies operation of at least one application executed by the one or more processors in accordance with the determined touch strength. In some embodiments, in accordance with a determination that a finger is pressed with a normal pressure on the touch-sensitive surface, the device scrolls a graphical user interface at a first speed, and in accordance with a determination that the finger is pressed hard on the touch-sensitive surface, the device scrolls a graphical user interface at a second speed lower than the first speed so that the user can more accurately scroll the graphical user interface.

The device typically includes a ringtone that is played at the portable device in response to an incoming call. In some embodiments, the device modifies (418) a length of the ringtone at least in accordance with the determined holding state. For example, the device may shorten the length when the portable device is determined to be located on a hard surface, for example a table, or already in a hand. The device may increase the length when the portable device is determined to be located in a pocket so that the user has more time to take the portable device out of the pocket.

In some embodiments, an application in the one or more programs is configured to light up the display by default in response to an input on one or more manual user input devices (e.g., a touch-sensitive display or a key or button) of the portable device. For example, an unlock screen application (e.g., unlock screen module 142, FIG. 1A), like a screen saver, keeps the display off or shows a blank screen on the display when the device has not been used for a predefined time, and in response to an input on one or more manual user input devices, the unlock screen application displays an unlock screen. The device conditionally modifies (420) the application in accordance with at least the determined holding state such that the application conditionally does not light up a display of the portable device. For example, in accordance with a determination that the device is stored in a pocket or a bag (e.g., which may be determined, for example, by detecting that the device is not being handheld and is not resting on a hard surface), the device prevents the unlock screen application from lighting up the device's display, even if the touch-sensitive display is detecting a touch or contact with the display, so as to preserve the device's battery power.

In some embodiments, the device detects (422, FIG. 4B) ambient brightness with a light sensor of the portable device (e.g., using optical sensor(s) 164, FIG. 1A), and modifies operation of at least one application executed by the one or more processors in accordance with the determined holding state and the ambient brightness. The combination of the holding state and the ambient brightness improves accuracy, for example, in determining whether the device is stored in a pocket or in a bag (where the ambient brightness is low).

The device typically includes a ringtone that is played at the portable device in response to an incoming call. In some embodiments, the device modifies (424) a length of the ringtone at least in accordance with the determined holding state and the ambient brightness. For example, the device may increase the length when the device is determined to be not held (e.g., based on the absence of finger contacts) and located in a pocket (e.g., based at least on the ambient brightness).

In some embodiments, an application in the one or more programs is configured to light up a display of the portable device by default in response to an input on one or more manual user input devices of the portable device (e.g., unlock screen module 142, FIG. 1A). The device conditionally modifies (426) the application in accordance with the determined holding state and the ambient brightness such that the application conditionally does not light up the display. For example, when the device is determined to be in a pocket or a bag, based on both a lack of ambient light and the device's holding state, the device prevents the device's unlock screen application from lighting up the device's display, even if the touch-sensitive display is detecting a touch or contact with the display, so as to preserve the device's battery power.

In some embodiments, the device launches (428) a pedometer application (e.g., pedometer widget 149-2, FIG. 1A) in accordance with the determined holding state and the ambient brightness. For example, the device launches the pedometer application when the portable device is determined to be located in a pocket (e.g., based on the absence of finger contacts and/or based on the touches by clothing) and when rhythmical motions of the device (motions corresponding to walking) are detected (e.g., by using accelerometer(s) 168, FIG. 1A).

In some embodiments, the device detects (430) an acceleration of the portable device using at least one accelerometer of the portable device, and modifies operation of at least one application executed by the one or more processors in accordance with the determined holding state and the acceleration of the portable device. For example, the device may determine that the device is being carried by a user who is in a vehicle, and modify or change the ringtone accordingly (e.g., reduce the volume).

The device typically includes a ringtone that is played at the portable device in response to an incoming call. In some embodiments, the device modifies (432) a length of the ringtone at least in accordance with the determined holding state and the acceleration of the portable device. For example, the device increases the length of the ringtone when the portable device is in a pocket of a running user so that the user can better hear the ringtone.

In some embodiments, the device determines (434, FIG. 4C) one or more locations of one or more contacts by a user on the enclosure of the portable device in accordance with the one or more signals produced by the one or more sensors.

In some embodiments, the device identifies (436) a user in accordance with the one or more locations of the one or more contacts. For example, a respective user has a respective hand size and a respective style of holding the device. Such information may be used to improve the security of the device. In some embodiments, the respective user may at least temporarily grab the device at combination of locations consistent with the user's hand size and style of holding the device, enabling the device to identify the device holder as the respective user. In some embodiments, the device determines grip strength of a user's hold on the portable device, and identifies the user in accordance with the one or more locations of the one or more contacts and respective grip strengths (e.g., more support on the index finger v. middle finger).

For touch-sensitive displays, the detected contact area of a finger is typically converted to a coordinate tuple (an (x, y) position or point). The coordinate tuple is then used (like the point of a cursor in a device with mouse-based input) to interact with and manipulate the user interface objects on the touch-sensitive display. The conversion of the two-dimensional finger contact area to a one-dimensional point (e.g., coordinate tuple) often requires careful adjustment. The centroid of the finger contact area typically does not correspond to the location that is perceived by a user as being touched. This may cause touch targeting errors when the user is trying to activate keys on a virtual keyboard or interact with other objects on the touch-sensitive display. The change in viewing parallax in different areas of the touch screen and the differences in contact areas between thumbs and other fingers may also lead to touch targeting errors and incorrect manipulations. Undoing erroneous manipulations and repeating touch inputs creates a significant cognitive burden on a user and may lead to user frustration. In addition, correcting touch inputs takes additional time, thereby wasting both human and device resources (e.g., time and battery power). This latter consideration is particularly important in battery-operated devices.

Therefore, in some embodiments, the device receives (438) one or more user contact areas on a touch-sensitive surface of the portable device; determines, for each user contact area, a respective finger contact coordinate tuple based on a respective location of a respective finger contact area and the determined holding state; and manipulates at least one of one or more user interface objects displayed on a display of the portable device in accordance with the one or more respective finger contact coordinate tuples. Thus, operation of device is modified by modifying the finger contact coordinate tuple based on the determined holding state.

FIG. 5 is a flow diagram illustrating method 500 of conditionally answering an incoming call in accordance with some embodiments. Method 500 is performed at a portable telephone device (e.g., portable device 200, FIG. 2A) with an enclosure, one or more processors for executing one or more programs, one or more actuators in or on the enclosure, one or more sensors in or on the enclosure, and memory storing one or more programs for execution by the one or more processors. The portable telephone device may include portable multifunction device 100 illustrated in FIG. 1. However, the portable telephone device requires modules and components necessary for its function as a portable telephone, and need not include all the modules and components illustrated in FIG. 1 (e.g., the portable telephone device may not include one or more of: touch-sensitive display system 112, proximity sensor 166, weather widget(s) 149-1, and widget creator module 150).

The device generates (502) mechanical vibrations with the one or more actuators (e.g., actuators 127 and/or speaker 111 in FIG. 1A, actuators 210 in FIGS. 2A-2B, or subsystems 230 and/or 232 in FIGS. 2C-2E).

The device detects (504) mechanical vibrations with the one or more sensors (e.g., sensors 129 and/or accelerometers 168 in FIG. 1A, sensors 220 in FIGS. 2A-2B, and subsystems 230 and 232 in FIGS. 2C-2E).

The device analyzes (506) one or more signals produced by the one or more sensors with respect to mechanical vibrations to determine a holding state of the portable telephone device (e.g., based on the amplitude, phase, or any other properties of mechanical vibrations).

The device conditionally answers (508) an incoming call in accordance with a change in the determined holding state of the portable telephone device (e.g., answer an incoming call when the portable device is picked up from a hard surface, for example a table top).

As described herein, method 500 provides an intuitive way to answer an incoming call. The method reduces the cognitive burden on a user when answering an incoming call, thereby creating a more efficient human-machine interface.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

The operations described above with reference to FIGS. 4A-4B and FIG. 5 may be implemented by components depicted in FIGS. 1A-1B. For example, detection operation 404, modifying operation 408, and conditional answering operation 508 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first event (e.g., grabbing a phone) corresponds to a predefined event or sub-event, such as answering an incoming call. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 6:
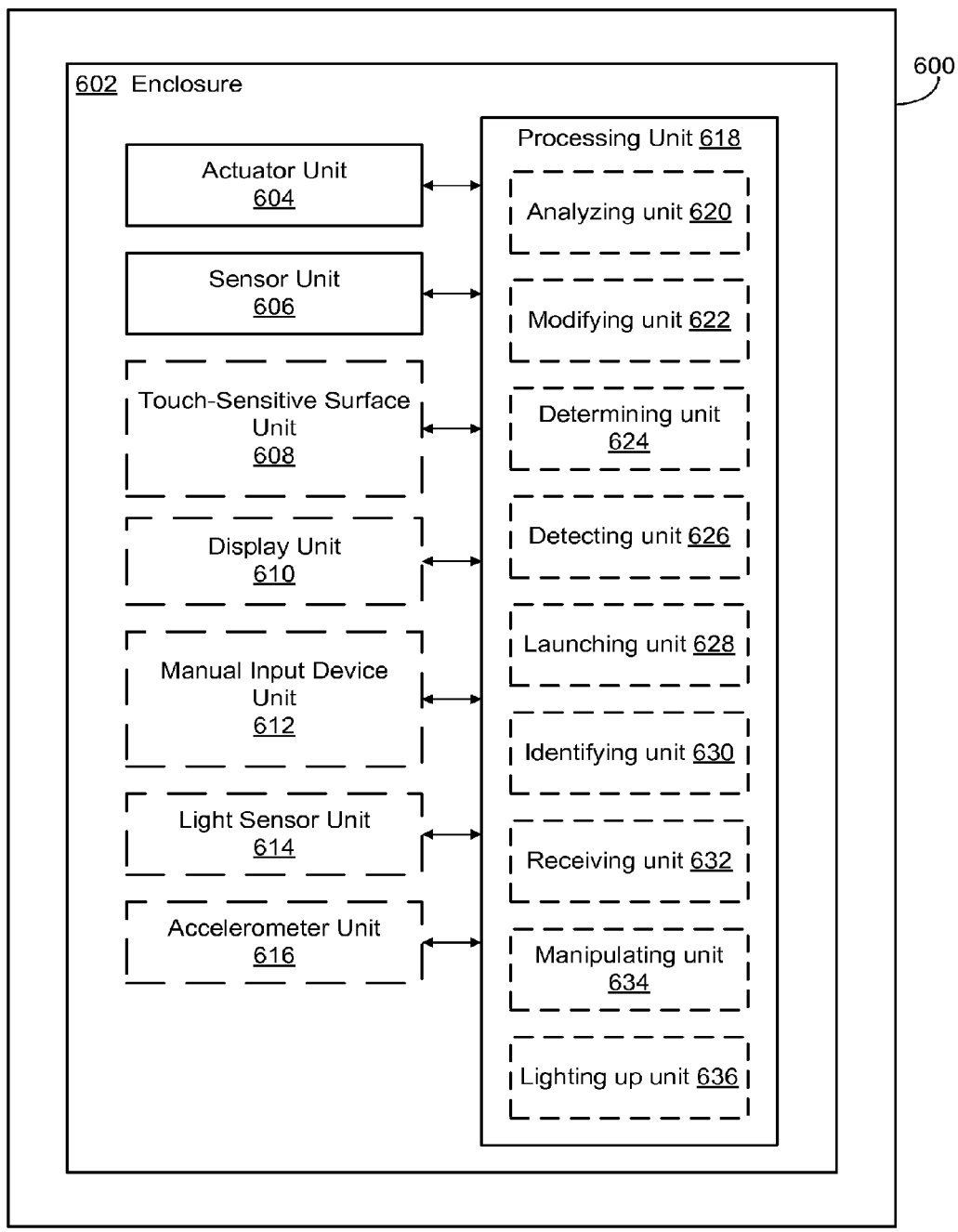
FIG. 6 is a functional block diagram of a portable electronic device in accordance with some embodiments.

In accordance with some embodiments, FIG. 6 shows a functional block diagram of a portable electronic device 600 configured in accordance with the principles of the invention as described above. The functional blocks of the device may be implemented by hardware, software, or a combination of hardware and software to carry out the principles of the invention. It is understood by persons of skill in the art that the functional blocks described in FIG. 6 may be combined or separated into sub-blocks to implement the principles of the invention as described above. Therefore, the description herein may support any possible combination or separation or further definition of the functional blocks described herein.

As shown in FIG. 6, a portable electronic device 600 includes an actuator unit 604 for generating mechanical vibrations; a sensor unit 606 for detecting mechanical vibrations; and a processing unit 618 coupled to the actuator unit 604 and the sensor unit 606. In some embodiments, the portable electronic device 600 includes an enclosure 602 that encloses processing unit 618, and optionally encloses other ones of the units of portable electronic device 600 described herein. In some embodiments, some of the units of portable electronic device 600 are mounted on enclosure 602, while others are enclosed within enclosure 602. In some embodiments, the processing unit 618 includes an analyzing unit 620, a modifying unit 622, a determining unit 624, a detecting unit 626, a launching unit 628, an identifying unit 630, a receiving unit 632, a manipulating unit 634, and a lighting up unit 636.

The processing unit 618 is configured to analyze one or more signals produced by the sensor unit 606 with respect to mechanical vibrations to determine a holding state of the portable device 600; and modify operation of at least one application executed by the processing unit 618 in accordance with the determined holding state.

In some embodiments, the sensor unit 606 and the actuator unit 604 comprise a same device.

In some embodiments, the sensor unit 606 includes a piezo transducer.

In some embodiments, the processing unit 618 is configured to determine a grip strength of a user's hold on the portable device 600 (e.g., with the determining unit 624).

In some embodiments, the processing unit 618 is configured to modify a user interface response to a user gesture in accordance with the determined grip strength (e.g., with the modifying unit 622).

In some embodiments, the processing unit 618 is configured to modify a scroll speed in response to a user scrolling gesture in accordance with the determined grip strength (e.g., with the modifying unit 622).

In some embodiments, the portable device 600 includes a touch-sensitive surface unit 608. The processing unit 618 is configured to analyze the one or more signals produced by the sensor unit 606 with respect to mechanical vibrations to determine a touch strength on the touch-sensitive surface unit 608. The processing unit 618 is configured to modify operation of at least one application executed by the processing unit 618 in accordance with the determined touch strength.

In some embodiments, the processing unit 618 is configured to modify a length of a ringtone at least in accordance with the determined holding state (e.g., with the modifying unit 622).

In some embodiments, the portable device 600 includes a display unit 610 and a manual input device unit 612. The processing unit 618 is configured to light up the display unit 610 by default in response to an input on the manual input device unit 612 (e.g., with the lighting up unit 636). The processing unit 618 is configured to modify operation of the processing unit 618 (e.g., with the modifying unit 622) in accordance with at least the determined holding state such that the processing unit 618 conditionally does not light up the display unit 610.

In some embodiments, the portable device 600 includes a light sensor unit 614. The processing unit 618 is configured to detect ambient brightness with the light sensor unit 614 (e.g., with the detecting unit 626); and the processing unit 618 is configured to modify operation of the processing unit 618 in accordance with the determined holding state and the ambient brightness (e.g., with the modifying unit 622).

In some embodiments, the processing unit 618 is configured to modify the length of a ringtone in accordance with the determined holding state and the ambient brightness (e.g., with the modifying unit 622).

In some embodiments, the portable device 600 includes a display unit 610 and a manual user input device unit 612. The processing unit 618 is configured to light up the display unit 610 by default in response to an input on the manual input device unit 612 (e.g., with the lighting up unit 630); and the processing unit 618 is configured to conditionally modify operation of the processing unit 618 (e.g., with the modifying unit 622) in accordance with the determined holding state and the ambient brightness such that the processing unit 618 conditionally does not light up the display unit 610.

In some embodiments, the processing unit 618 is configured to launch a pedometer application in accordance with the determined holding state and the ambient brightness (e.g., with the launching unit 628).

In some embodiments, the portable device 600 includes a accelerometer unit 616. The processing unit 618 is configured to detect an acceleration of the portable device 600 using the accelerometer unit 616 (e.g., with the detecting unit 626); and the processing unit 618 is configured to modify operation of the processing unit 618 in accordance with the determined holding state and the acceleration of the portable device 600 (e.g., with the modifying unit 622).

In some embodiments, the processing unit 618 is configured to modify the length of a ringtone in accordance with the determined holding state and the acceleration of the portable device 600 (e.g., with the modifying unit 622).

In some embodiments, the processing unit 618 is configured to determine one or more locations of one or more contacts by a user on the enclosure 602 of the portable device 600 in accordance with the one or more signals produced by the sensor unit 606.

In some embodiments, the processing unit 618 is configured to identify a user in accordance with the one or more locations of the one or more contacts (e.g., with the identifying unit 630).

In some embodiments, the portable device 600 includes a display unit 610 and a touch-sensitive surface unit 608. The processing unit 618 is configured to: receive one or more user contact areas on the touch-sensitive surface unit 608 (e.g., with the receiving unit 632); determine, for each user contact area, a respective finger contact coordinate tuple based on a respective location of a respective finger contact area and the determined holding state (e.g., with the determining unit 624); and manipulate at least one of one or more user interface objects displayed on the display unit 610 in accordance with the one or more respective finger contact coordinate tuples (e.g., with the manipulating unit 634).

Figure 7:
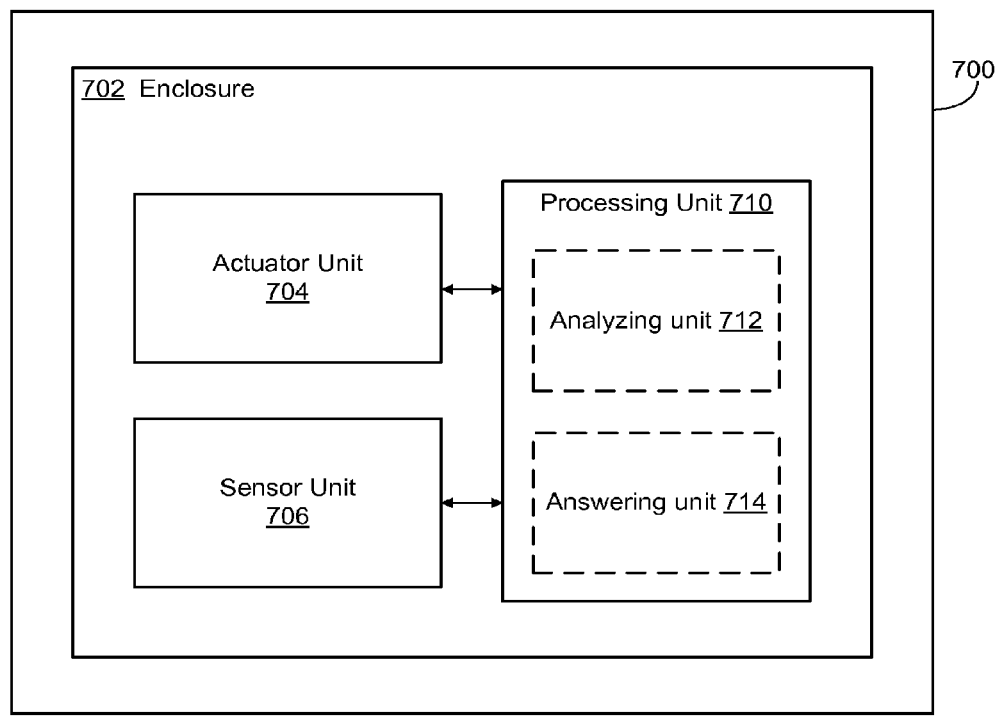
FIG. 7 is a functional block diagram of a portable telephone device in accordance with some embodiments.

In accordance with some embodiments, FIG. 7 shows a functional block diagram of a portable telephone device 700 configured in accordance with the principles of the invention as described above. The functional blocks of the device may be implemented by hardware, software, or a combination of hardware and software to carry out the principles of the invention. It is understood by persons of skill in the art that the functional blocks described in FIG. 7 may be combined or separated into sub-blocks to implement the principles of the invention as described above. Therefore, the description herein may support any possible combination or separation or further definition of the functional blocks described herein.

As shown in FIG. 7, a portable telephone device 700 includes an actuator unit 704 for generating mechanical vibrations; a sensor unit 706 for detecting mechanical vibrations; and a processing unit 710 coupled to the actuator unit 704 and the sensor unit 706. In some embodiments, the processing unit 710 includes an analyzing unit 712, and an answering unit 716.

The processing unit 710 is configured to: analyze one or more signals produced by the sensor unit 706 with respect to mechanical vibrations to determine a holding state of the portable telephone device 700 (e.g., using the analyzing unit); and conditionally answer an incoming call in accordance with a change in the determined holding state of the portable telephone device 700 (e.g., using the answering unit).

In some embodiments, portable telephone device 700 includes an enclosure 702 that encloses processing unit 710, and optionally encloses other ones of the units of portable telephone device 700 described herein. In some embodiments, some of the units of portable telephone device 700 are mounted on enclosure 702, while others are enclosed within enclosure 702.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated

We claim:
1. A computing device, comprising:
 a processor; and
 a memory for storing instructions which, when executed by the processor performs a method for operating the computing device, the method comprising:
 receiving a first touch input on a touch-sensitive surface of the computing device, the first touch input having a first amount of pressure;
 in response to receiving the first touch input, causing an application executing on the computing device to provide a first output on a display;
 receiving a second touch input on the touch-sensitive surface of the computing device, the second touch input having a second amount of pressure that is different than the first amount of pressure; and
 in response to receiving the second touch input, causing the application executing on the computing device to provide a second output on the display that is different than the first output.

2. The computing device of claim 1, further comprising at least one sensor, wherein the at least one sensor is configured to determine the first amount of pressure and the second amount of pressure.

3. The computing device of claim 1, wherein the first touch input is a gesture.

4. The computing device of claim 1, wherein the second touch input is a gesture.

5. The computing device of claim 1, wherein at least one of the first touch input and the second touch input is provided by a stylus.

6. A method for operating a computing device, comprising:
   receiving a touch input on a touch-sensitive surface;
   determining an amount of pressure of the touch input;
   causing an application being executed on the computing device to provide a first output on a display of the computing device in response to a determination that a first amount of pressure is received by the touch-sensitive surface; and
   causing the application being executed on the computing device to provide a second output on the display of the computing device in response to a determination that a second amount of pressure is received by the touch-sensitive surface.

7. The method of claim 6, wherein the touch input is provided by a stylus.

8. The method of claim 6, wherein the touch input is a gesture.

9. The method of claim 6, further comprising determining a holding state of the computing device based on feedback received from one or more sensors associated with the computing device.

10. A non-transitory computer-readable medium storing computer-executable instructions which, when executed by a processor perform a method for operating a computing device, comprising:
    receiving a first touch input on a touch-sensitive surface of the computing device, the first touch input having a first amount of pressure;
    in response to receiving the first touch input, causing an application executing on the computing device to provide a first output on a display;
    receiving a second touch input on the touch-sensitive surface of the computing device, the second touch input having a second amount of pressure that is different than the first amount of pressure; and
    in response to receiving the second touch input, causing the application executing on the computing device to provide a second output on the display that is different than the of output.

11. The non-transitory computer-readable medium of claim 10, further comprising at least one sensor, wherein the at least one sensor is configured to determine the first amount of pressure and the second amount of pressure.

12. The non-transitory computer-readable medium of claim 10, wherein the first touch input is a gesture.

13. The non-transitory computer-readable medium of claim 10, wherein the second touch input is a gesture.

14. The non-transitory computer-readable medium of claim 10, wherein at least one of the first touch input and the second touch input is provided by a stylus.

15. The computing device of claim 1, further comprising an actuator operative to provide a vibration in response to the first touch input.

16. The computing device of claim 1, further comprising an actuator operative to provide a vibration in response to the second touch input.

17. The method of claim 6, further comprising providing a vibration when the first amount of pressure is received by the touch-sensitive surface.

18. The method of claim 6, further comprising providing a vibration when the second amount of pressure is received by the touch-sensitive surface.

19. The non-transitory computer-readable medium of claim 10, further comprising instructions for causing an actuator to provide a vibration in response to the first touch input.

20. The non-transitory computer-readable medium of claim 10, further comprising instructions for causing an actuator to provide a vibration in response to the second touch input.

* * * * *